June 7, 1960   L. P. DOSMANN ET AL   2,939,710
PAINTING OF GOLF BALLS
Filed Oct. 1, 1956
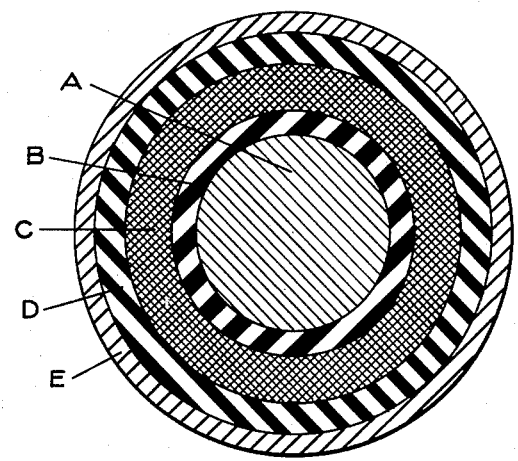
A LIQUID CORE OR SOLID CORE
B RUBBER COVERING
C RUBBER WIND (NATURAL)
D MOLDED SKIN (BALATA COMPOUND)
E EPOXY POLYAMIDE PAINT COMPOUND

2,939,710
PAINTING OF GOLF BALLS

Lucian P. Dosmann and David D. M. Streed, South Bend, Ind., assignors to United States Rubber Company, New York, N.Y., a corporation of New Jersey
Filed Oct. 1, 1956, Ser. No. 612,919
6 Claims. (Cl. 273—235)

This invention relates to a method of painting golf balls, and also to golf balls coated with a paint.

The principal object of the invention is to provide a golf ball coated with an economical fast-drying and non-yellowing white paint that can be applied in an efficient and convenient manner to a golf ball to form a firmly adherent protective coating that improves the appearance of the ball and makes the ball more durable and more resistant to scuffing.

A further object is to provide such a coating that will receive and retain permanently branding and transfer embossing of the manufacturers' or customers' markings, and further the coating is highly resistant to detergents and chemicals usually encountered in ball cleaning units on golf courses and golf ball driving ranges.

A further object is to provide such a coating which is highly resistant to discoloration induced by chemicals utilized in conditioning and curing the underlying ball cover stock.

The invention is based on the use of a novel coating or paint, of which the principal film-forming ingredient is a self-curing blend of soluble polyamide resin and soluble epoxy resin. The polyamide-epoxy resin mixture forming the basis of the present invention is known. Thus, for example, in the article entitled "Alloying with Epoxides," by John Charlton, appearing in Modern Plastics for September 1954, at page 155, there are described resin systems in which polyamide resins and epoxy resins are interacted with each other to form a cured product. Similarly, in U.S. Patent No. 2,707,708, issued to Wittcoff, on May 3, 1955, mixtures of polyamide resins and epoxy resins which react to produce insoluble, infusible materials are referred to. Also, in U.S. Patent No. 2,698,315, issued to Greenlee, on December 28, 1954, the mutual cross-linking interaction of polyamides and epoxy resins is described. Such prior teachings are hereby incorporated in the present disclosure by reference, as representative of the epoxides and polyamides employed in the present invention, and as showing methods of making the starting materials used in the invention.

The accompanying drawing shows a conventional golf ball in cross-section illustrating the various components including the improved paint compound.

Preferred polyamide resins suitable for use in the invention may be prepared by the condensation of polymerized unsaturated fatty acids (e.g., dilinoleic acid) with aliphatic amines. Methods of effecting such condensation are described, for example, in U.S. Patents Nos. 2,450,940 to Cowan et al., dated October 12, 1948, and 2,705,223 to Renfrew et al., dated March 29, 1955, incorporated herein by reference. Such polyamides may be described as reaction products of polymeric fatty acids containing at least two (2) carboxy groups and an aliphatic polyamine (e.g., ethylene diamine). The resulting polyamide is characterized by the presence of free amine groups or free carboxyl groups. The commercially available polyamides which were sold under the trade designation "Polyamide Resin 100" and "Polyamide Resin 115," by General Mills, Inc., as described in their technical bulletin 11–1–2, published in 1954, are examples of suitable materials.

With regard to the epoxy resin, this ingredient is also a known material requiring no detailed description here. Reference may be had to the above-mentioned patents of Greenlee, Renfrew et al., or Wittcoff, for a complete description of typical epoxy resins employed in the invention. They are commonly complex polymeric reaction products of polyhydric alcohols with polyfunctional halohydrins such as epichlorohydrin and glycerol dichlorohydrin. The products obtained may contain terminal epoxy groups, with or without terminal primary hydroxyl groups. Typical phenols employed include resorcinol, and various bisphenols (see, for example, U.S. Patent No. 2,585,115 to Greenlee, dated February 12, 1952). Such epoxy resins are commercially available under such trade designations as "Bakelite C-8 Epoxy Resin" (Bakelite Co.), "Araldite CN" (Ciba Co.), "Epon" (Shell Chemical Corp.), and "Hysol" (Houghton Laboratories, Inc.).

In accordance with the invention, a golf ball paint is formulated by dissolving from 50 to 90 parts of 100% polyamide resin and from 10 to 50 parts of 100% epoxy resin in suitable volatile organic solvents such that a sprayable mixture results. The painting or dipping composition contains from 40 to 80 percent solvent based on the total mixture including pigments.

Solvent range

For best coverage with minimum coatings, 40% solids has been found to be about optimum conditions. At low solids (20–30%) a loss of gloss results and extra number of coats are required to obtain the weight deposition. At too high solids, viscosity, instability of the resin blend, poorer adhesion, poor flow out, and dimple edge coverage are general factors that are affected.

High boiling solvents were found to be essential to good paint coverage and the paint dried about as rapidly as the lower boiling type solvents. This was attributed to an even loss of solvent with high boiling solvents rather than a skinning over of the surface resulting in a slower drying rate with the low boiling solvents. Usable solvents include methyl ethyl ketone, isopropanol, Cellosolve, toluol, xylol, ethanol, methanol, propanol, etc. Polyamides are solubilized in alcohols and ethers while epoxy resins require aromatic or ketone type solvents.

The paint of the invention further includes 15 to 25 parts of an oxide selected from the group consisting of zinc oxide and antimony oxide, as well as 50 to 75 parts of titanium dioxide. There is also included, by weight, about 0.2 part (per 100 parts of polyamide resin and epoxy resin) of 4-methyl-7-diethylamino coumarin and about 0.5 part (per 100 parts of resins) of violet tint.

The following is an example of a suitable paint:

| Ingredient | Wet Weight | Dry Weight |
|---|---|---|
| Versamide 401 [1] (60% solids) | 127.0 | 76.4 |
| Hysol 2050 [2] (70% Epoxy Resin in Solvent) | 33.7 | 23.6 |
| $TiO_2$ (RANC (Titanox) (Titanium Pigment Corp.) or "Ti-Pure" R-110 (Du Pont)) | 65.0 | 65 |
| ZnO | 22.0 | 22 |
| MDAC (4-Methyl-7-diethylamino coumarin) | 0.23 | .23 |
| B-11 (Violet Tint) | 0.45 | .45 |
| Xylene | 201.0 | |
| Cellosolve (Solvent) | 22.4 | |
| | 471.78 | 187.68 |

[1] Versamide 401 is a 60% solids polyamide dissolved in a 9:1 ratio of xylene and Cellosolve. The 100% solids Versamide is the same as Polyamide 100 described in the aforesaid bulletin 11–1–2. The 100% solids Versamide or Polyamide 100 is a soft, tacky resin.

[2] Hysol 2050 is a high viscosity liquid epoxy resin of the following properties:

Viscosity at 25° C. _____ cps __ 1650–2000
Solids content _____ percent __ 69–72
Volatile _____ do ____ 28–31

The volatile solvent is a diluent such as toluol or other aromatic type solvent.

As to pigmentation, titanium dioxide is essential to a true white paint, but in addition to the titanium dioxide, zinc oxide was added which gave even a whiter white. In spite of the high ratio of pigment there results a paint formulation without reducing the gloss.

The polyamide-epoxy paint can also be prepared by ball milling separately the two mentioned resins with a proportional amount of pigments and solvents.

Working formulae are as follows:

|  | (A) Polyamide Mix | | (B) Epoxy Mix | |
| --- | --- | --- | --- | --- |
|  | Wet Wgt. | Dry Wgt. | Wet Wgt. | Dry Wgt. |
| Versamide 401 (60%) | 167 | 100 | | |
| Hysol 2050 (70%) | | | 143 | 100 |
| Titanox RANC | 60 | 60 | 86 | 86 |
| XX 601 Zinc Oxide | 20 | 20 | 28.6 | 28.6 |
| MDAC | 0.2 | 0.2 | 0.2 | 0.2 |
| B-11 Violet Tint | 0.4 | 0.4 | 0.4 | 0.4 |
| Toluol | 100 | | 155 | |
| Cellosolve | 12 | | 17 | |
|  | 359.6 | 180.6 | 429.2 | 215.2 |

Separate ball mills are charged with the above wet ingredients, which are then milled for 24 hours.

Mix (A) and mix (B) are blended in the ratio of 2.29 wet parts of polyamide (A) mix to one part of wet Epon (B) mix. The mix is then reduced with solvent containing 9 parts by weight of toluol and one part Cellosolve to produce a 40% solids solution. The formulae (A) and (B) blend easily by stirring. By ball mill grinding the separate components, a better dispersion and a whiter white coating is produced. Alternatively, one may place all the compound ingredients in the epoxy mix and ball mill it separately from the polyamide resin. The polyamide resin is then added to the ball mill mix.

The cover of the golf ball is of course ordinarily made of a tough resilient cover material, e.g., balata and/or natural, and synthetic rubber or mixtures thereof. To chlorinate the surface, golf balls are exposed in the usual manner to a saturated solution of chlorine water or its equivalent of free chlorine in hypochlorite solution for a period ranging from 5 to 15 minutes. Then the golf balls are rinsed in water and/or neutralized in dilute ammonia water for 1 to 5 minutes and rinsed again.

No solvent dip or adhesive dip is necessary, in contrast to conventional practice. Neither is it necessary to prime the surface, as in conventional practice.

Two coats of the paint, exemplified above, are applied to the thus prepared ball by any suitable method, such as by spraying. The paint is allowed to dry 3 minutes between coats and 8 hours after the final coating in forced drying air. The temperature used ranges from 100–150° F.

During the drying the polyamide resin and the epoxy resin in the coating exert a mutual curing action on each other, producing an unusually tough and durable coating. The paint has unusual hiding power, in combination with the pigments described. The paint retains its pleasing white appearance indefinitely. The coating is much more convenient to apply than conventional golf ball paints, and the preparation of the ball is greatly simplified in the present method. Many other advantages will be apparent to those skilled in the art of painting golf balls.

The painting of golf balls in accordance with this invention offers the following advantages:

(a) The 3 day drying period normally required for conventional oxidizing oil type paints is reduced to less than 1 day (8 hours).

(b) The new paint has the advantages of a fast drying lacquer finish without the disadvantages of softness and marring properties associated with non-curing coatings.

(c) The new paint does not skin in the can on exposure to air as do oil paints.

(d) The new paint has remarkable wearing qualities which are demanded by golf ball driving ranges. It will outwear by far the conventional oil type paint.

(e) The new paint eliminates need for a primer coating which is usually a composition differing from the final finish coating. This permits use of only one type of paint in our process, and avoids contamination of primer and final paints.

Having thus described our invention, what we claim and desire to protect by Letters Patent is:

1. A golf ball having adhered to the tough resilient cover a firmly adherent, scuff-resistant, pigmented, non-yellowing coating containing as the primary film-forming ingredients a blend of a soluble polyamide resin and a soluble epoxy resin in the proportions, by weight, of about 50 to about 90 parts of the polyamide resin and, correspondingly, about 50 to about 10 parts of the epoxy resin, the pigment comprising titanium dioxide.

2. A golf ball having adhered to the tough resilient cover a firmly adherent, scuff-resistant, pigmented, non-yellowing coating containing as the primary film-forming ingredients about 100 parts by weight of a blend of a soft, tacky polyamide resin, having an amine value of about 83–93 and an average molecular weight of from about 3000 to about 6500, and a liquid epoxy resin, having an epoxy value of about 0.22 to about 0.26 per 100 grams, said resins being present in a weight ratio of about 76 : 24, the pigment comprising 15 to 25 parts by weight of an oxide selected from the group consisting of zinc oxide and antimony oxide and 50 to 75 parts by weight of titanium dioxide.

3. The method of painting a golf ball having a tough resilient rubbery cover material which comprises the steps of: (1) chlorinating said cover material; (2) neutralizing the resultant chlorinated surface; (3) coating the thus treated surface with a compositon comprising a titanium dioxide pigment dispersion in an organic solvent solution of a blend of a soluble polyamide resin and a soluble epoxy resin in the proportions, by weight, of about 50 to about 90 parts of the polyamide resin and, correspondingly, about 50 to about 10 parts of the epoxy resin, said composition having a total solids content of from about 40% to about 60%, based on the total composition; (4) drying the resultant coating at a temperature of up to 150° F.; (5) applying a second coating, using a composition as defined in step (3); and (6) drying the resultant coating at a temperature of up to 150° F., so as to form on said golf ball a firmly adherent, scuff-resistant, non-discoloring coating.

4. In a method of painting a golf ball having a tough resilient rubbery cover material in which said cover material is chlorinated and then neutralized, and in which the applied paint coatings are dried at temperatures of up to 150° F., the improvement which consists in applying directly to said neutralized cover material a composition comprising a titanium dioxide pigment dispersion in an organic solvent solution of a blend of a soluble polyamide resin and a soluble epoxy resin in the proportions, by weight, of about 50 to about 90 parts of the polyamide resin and, correspondingly, about 50 to about 10 parts of the epoxy resin, said composition having a total solids content of from about 40% to about 60%, based on the total composition, so as to form on said golf ball a firmly adherent, scuff-resistant, nondiscoloring coating.

5. The method of claim 4, in which said composition comprises 15 to 25 parts by weight of an oxide selected from the group consisting of zinc oxide and antimony oxide, 50 to 75 parts by weight of titanium dioxide, about 100 parts by weight of a blend of a soft, tacky polyamide resin, having an amine value of about 83–93 and an average molecular weight of from about 3000 to about 6500, and a liquid epoxy resin, having an epoxy value of about 0.22 to about 0.26 per 100 grams, said resins being present in a weight ratio of about 76 : 24; and sufficient organic solvent for said blend to yield a composition having from about 40% to about 60% solids, based on the total composition.

6. The method of claim 4, in which said applied composition is dried for a period on the order of 3 minutes prior to applying a second coating of said composition.

References Cited in the file of this patent

UNITED STATES PATENTS

| | | |
|---|---|---|
| 2,015,165 | Twiss et al. | Sept. 24, 1935 |
| 2,302,557 | Langkammerer | Nov. 17, 1942 |
| 2,707,708 | Wittcoff | May 3, 1955 |

OTHER REFERENCES

Modern Plastics, September 1954, pgs. 156, 160, 161, 240, 243.

Industrial and Engineering Chemistry, October 1954, pgs. 2226–2232.

The Chemical Age, April 21, 1956, pgs. 893, 894.